No. 843,588. PATENTED FEB. 12, 1907.
C. H. DITTO.
DECOY.
APPLICATION FILED MAY 21, 1906.

Witnesses: Inventor
Charles H. Ditto
By his Attorney
Edward N. Pagelsen

UNITED STATES PATENT OFFICE.

CHARLES H. DITTO, OF KEITHSBURG, ILLINOIS.

DECOY.

No. 843,588.      Specification of Letters Patent.      Patented Feb. 12, 1907.

Application filed May 21, 1906. Serial No. 317,857.

*To all whom it may concern:*

Be it known that I, CHARLES H. DITTO, a citizen of the United States, and a resident of Keithsburg, in the county of Mercer and State of Illinois, have invented a new and Improved Decoy, of which the following is a specification.

My invention relates to decoys for waterfowl, such as ducks and geese; and the object of my improvement is to provide means whereby decoys of this kind can be caused to move when in the water.

My invention consists of an extensible pole, a decoy or imitation of a bird pivoted thereto, springs to normally hold the decoy in upright position, and means to cause the decoy to move and splash the water.

Figure 1:
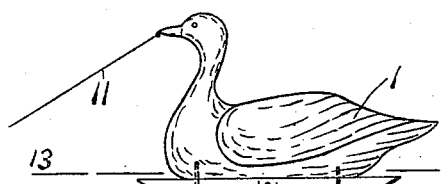
Figure 2:
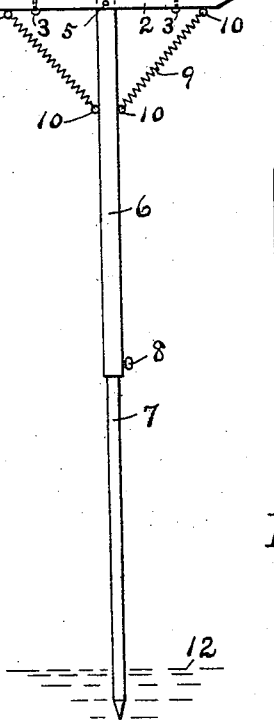
Figure 3:
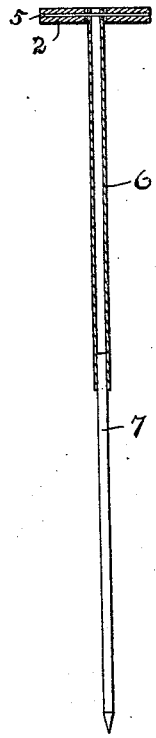

In the accompanying drawings, that illustrate my invention, Figure 1 is a side view of the decoy in proper position. Fig. 2 is a plan of the support for the decoy proper. Fig. 3 is a central cross-section of the support at right angles to the view in Fig. 1.

Similar reference characters refer to like parts throughout the several views.

Ducks and geese fly more during the morning and late evening hours than at any other time, and during these hours there is generally less breeze and the water is usually more quiet than during the other parts of the day, because the earth, water, and air are more nearly of the same temperature. Decoys placed on still water are unnaturally quiet, and the lack of movement often renders them of little value, as ducks on good feeding-grounds are always very active. In the drawings I have shown a device whereby the decoys are adapted to move and splash in the water, causing the still water to be broken and rendering the decoys more deceptive.

The decoy 1 proper is secured to the plate or board 2 by means of the screws 3, which pass through the holes 4. A pivot-rod 5 passes through the plate 2 and the hole 14 therein and through the holes at the upper end of the pipe 6. A rod 7 is slidable in this pipe and may be secured at any desired position by the screw 8. Springs 9 connect to eyelets 10, secured in the plate 2 and pipe 6, and tend to return the decoy and plate to the position shown in Fig. 1. To the bill of the decoy is attached the fine wire or line 11, by means of which the concealed hunter can swing the decoy about the pivot 5.

The rod 7 is extended the proper distance so that it may be pushed into the bottom 12 of the pond, lake, or stream to a depth sufficient to hold the decoy in place and so that the plate 2 will be just below the water-line 13 13. When the decoy is rocked by means of the wire 11, this plate will agitate the water sufficiently to cause decoys of the usual type to bob around and also to break the surface of the water for some distance around the decoys.

Having now explained my improvement, what I claim as my invention, and desire to secure by Letters Patent, is—

1. In a decoy for water-fowl, the combination of telescoping anchoring means, a transverse pivot at the upper end thereof, an imitation of a bird mounted thereon, and means to normally hold said parts in proper position.

2. In a decoy for water-fowl, the combination of a tube, a plate pivoted to the upper end thereof, springs to normally hold said plate in position, a decoy secured to said plate, and an anchoring-rod slidable in said tube.

3. In a decoy for water-fowl, the combination of a tube, a plate pivoted to the upper end of the tube, a spring secured to each end of said plate and to said tube to hold said plate at right angles to the tube, a decoy secured to the plate, an anchoring-rod slidable in the tube, and means to lock the rod in any desired position.

In testimony whereof I have signed my name to this specification in the presence of two subscribing witnesses.

CHARLES H. DITTO.

Witnesses:
   J. W. GRAY,
   L. J. TEMPLE.